(12) United States Patent
Hunt

(10) Patent No.: US 6,829,072 B1
(45) Date of Patent: Dec. 7, 2004

(54) HIGH SPEED ACTIVE OPTICAL SYSTEM FOR PHASE-SHIFTING PORTIONS OF AN INCOMING OPTICAL WAVEFRONT

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/789,178

(22) Filed: Feb. 26, 2004

(51) Int. Cl.$^7$ .............................. G02F 1/03; H01L 29/06
(52) U.S. Cl. ...................... 359/248; 359/245; 359/238; 257/21
(58) Field of Search .............................. 359/248, 245, 359/238, 298, 240, 249, 250, 252; 257/21, 14, 428

(56) References Cited

U.S. PATENT DOCUMENTS

| | | | |
|---|---|---|---|
| 5,521,743 A | | 5/1996 | Holmes et al. ............. 359/248 |
| 5,552,912 A | * | 9/1996 | Sharp et al. ................ 349/117 |
| 5,602,662 A | * | 2/1997 | Rosenblatt et al. ......... 349/130 |
| 6,373,387 B1 | * | 4/2002 | Qiu et al. ................ 340/572.1 |
| 6,577,387 B2 | * | 6/2003 | Ross et al. .................. 356/124 |

OTHER PUBLICATIONS

J.H. Hunt and R.B. Holmes, Observation of Optical Response of Avalanche Photodiodes at Photon–Counting Light Levels, Journal, May 30, 1994, 3 pgs., Appl. Phys. Lett. 64 (22).

L. Quian , S.D. Benjamin, P.W.E. Smith, B.J. Robinson, & D.A. Thompson, Picosecond Carrie Lifetime and Large Optical Nonlinearites in InGaAsP Grown by He–Plasma–Assisted Molecular Beam Epitaxy, Journal, Jan. 15, 1997, 3 pgs., Optics Letters, vol. 22, No.2.

L. Quian , S.D. Benjamin, P.W.E. Smith, B.J. Robinson, & D.A. Thompson, Subpicosecond Carrier Lifetime in Beryllium–Doped InGaAsP Grown by He–Plasma–Assisted Molecular Beam Epitaxy, Journal, Sep. 15, 1997, 3 pgs., Appl Phys. Lett 71 (11).

* cited by examiner

Primary Examiner—Tim Thompson
(74) Attorney, Agent, or Firm—Stradling Yocca Carlson and Rauth

(57) ABSTRACT

The present application is directed to high speed optical system. In one embodiment, the optical system includes a photodiode which is sensitive to a wavelength of light, an image source irradiating a wavefront of a first wavelength on the photodiode to which the photodiode is sensitive, the wavefront containing an optical path difference induced phase-shift, a read source of photons irradiating photons of a second wavelength to which the photodiode is insensitive, an electric field across the photodiode in excess of the breakdown voltage thereof and configured to result in an avalanching of electrons in the photodiode when the photons from the first source strike the photodiode, the avalanching electrons resulting in a photorefractive response which changes the index of refraction in the photodiode, and a capture device in optical communication with and configured to capture light reflected from the photodiode.

25 Claims, 3 Drawing Sheets

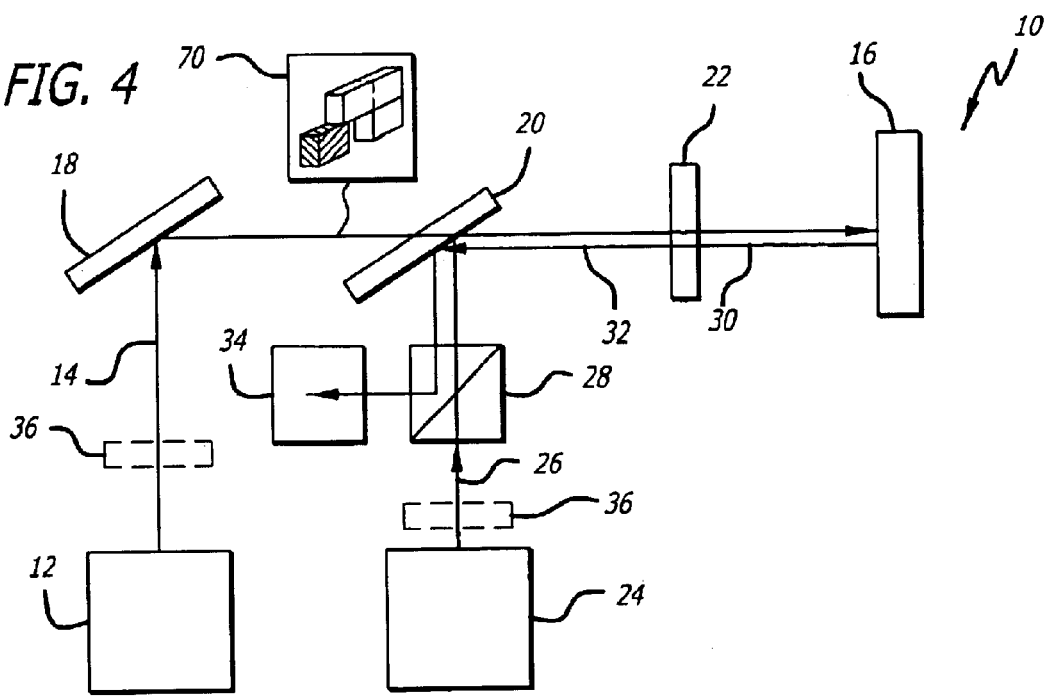
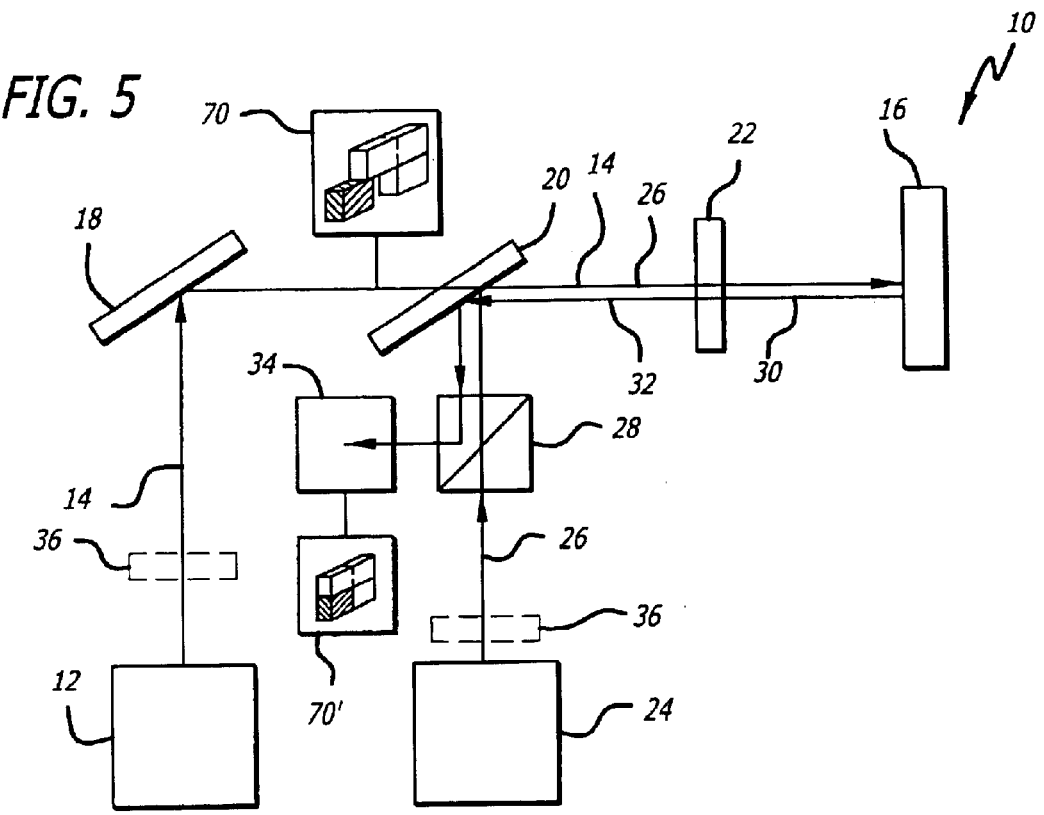

HIGH SPEED ACTIVE OPTICAL SYSTEM FOR PHASE-SHIFTING PORTIONS OF AN INCOMING OPTICAL WAVEFRONT

BACKGROUND

In media having a constant index of refraction, the optical path length may be defined as the product of the geometric distance through which an optical wavefront traverses and the refractive index of the media. In contrast, as an image or optical signal propagates through a turbulent media random fluctuations in the index of refraction of the media results in variations of the optical path length. For example, an image propagating through the atmosphere encounters localized variations in the refractive index of the air. As such, the optical path length of a media having a varying index of refraction may be defined as the integral of n $\delta_s$, where $\delta_s$ is an element of length along the path, and n is the local refractive index. Variations in the optical path length leads to randomization of the phase front contour of the wavefront, thereby causing the image to be obscured. This phenomena is known as phase-shifting.

FIG. 1 shows a representation of an optical signal propagating through a space. As illustrated, the exemplary wavefront or optical signal 1 may be segmented into four quadrants 1A, 1B, 1C, and 1D. As the wavefront 1 propagates through the space 2, quadrants 1A, 1B, 1C, and 1D are subjected to the optical characteristics of the space 2. For example, the index of refraction of the space 2 may not be uniform. As shown in FIG. 1, the space 2 may include areas of uniform refractive properties 3A, 3B, and 3C, as well as one or more areas of variable refractive properties 3D. As such, the optical path length the wavefront 1 traverses is not uniform, thereby distorting, defocusing, or otherwise compromising the wavefront 1 as it propagates through the space 2. As shown in FIG. 1, when quadrant 1D of the wavefront 1 is subjected to a higher refractive index 3D of the space 2, quadrant 1D traverses a greater optical path length than the neighboring wavefront quadrants 1A, 1B, and 1C. As such, the output wavefront 4 undergoes phase-shifting. As illustrated, the output wavefront 4 includes quadrants 4A, 4B, and 4C which are substantially in phase having traversed an equal optical path length. However, at a time t, quadrant 4D has traversed an optical path length less than the adjoining quadrants 4A, 4B, 4C, and is, thus, out of phase with the adjoining quadrants 4A, 4B, 4C.

In response, a number of systems and techniques have been developed to restore the original phase state of optical signals. One system which has been developed employs adaptive optics or active optical control systems to address variations in optical path lengths. Typically, active optical systems make use of adaptive optical elements that are based on mechanical implementation. One example of an adaptive optical element is a deformable mirror. The deformable mirror includes a distortable substrate having a light-reflecting material applied thereto. The substrate includes a number of small actuators coupled thereto which push or pull segments of the substrate, thereby reconfiguring the shape of the deformable mirror. In doing so, the actuators compensate for the distortions in the beam phase by making some parts of the optical path shorter and some parts of the optical path longer.

While present adaptive optics or active optical control systems have proven useful in many applications, a number of shortcomings have been identified. For example, these systems transform what fundamentally is an optical problem into a mechanical problem. As such, the mechanical systems used to reconfigure the deformable mirror may introduce jitter or noise into the signal. In addition, the response times of these systems may be unacceptably slow for high date rate applications. For example, response times in the range of megahertz to several gigahertz are not uncommon.

Thus, in light of the foregoing, there is an ongoing need a system capable of rapidly correcting for phase-shifting errors in optical signals.

BRIEF SUMMARY

The various embodiments of the optical system disclosed herein enable a user to easily correct for phase-shifts and aberrations in optical signals. Furthermore, the various systems disclosed herein permit optical corrections of incoming signals, thereby reducing jitter and aberrations associated with presently available mechanical systems.

In one embodiment, the present application is directed to a high speed optical system and discloses a photodiode which is sensitive to a wavelength of light, an image source irradiating a wavefront of a first wavelength on the photodiode to which the photodiode is sensitive, the wavefront containing an optical path difference induced phase-shift, a read source irradiating photons of a second wavelength on the photodiode to which the photodiode is insensitive, an electric field across the photodiode in excess of a breakdown voltage thereof and configured to result in an avalanching of electrons in the photodiode when the photons from the first source strike the photodiode, the avalanching electrons resulting in a photorefractive response which changes the index of refraction in the photodiode, and a capture device in optical communication with and configured to capture light reflected from the photodiode.

In an another embodiment, the present application is directed to a high speed optical system and discloses an InGaAsP photodiode which is sensitive to a wavelength of light, a first source of photons configured to transmit a wavefront at a first wavelength to which the photodiode is sensitive incident on the photodiode, the wavefront having an optical path difference induced phase-shift, a second source of photons at a second wavelength to which the photodiode is insensitive incident on the photodiode, an electric field across the photodiode in excess of a breakdown voltage thereof and configured to result in an avalanching of electrons in the photodiode when the photons from the first source strike the photodiode, the avalanching electrons resulting in a photorefractive response which changes the index of refraction in the photodiode, and a capture device in optical communication with and configured to capture light reflected from the photodiode.

In still another embodiment, the present application is directed to a high speed optical system and discloses an InGaAsP photodiode having a bandgap, the photodiode configured to operate in Geiger mode, a first photon source configured to transmit a wavefront at a first wavelength to which the photodiode is sensitive incident on the photodiode, the wavefront having an optical path difference induced phase-shift, the first wavelength less than the bandgap of the photodiode, a second photon source configured to emit light of a second wavelength, the second wavelength greater than the bandgap of the photodiode, a beam combiner positioned within an optical path and configured to combine the first and second wavelengths, an electric field applied across the photodiode greater than a breakdown voltage thereof, the electric field configured to result in avalanching of electrons in the photodiode when photons from a first photodiode are incident thereon, the avalanche of electrons resulting in a photorefractive response within the photodiode, and a capture device in optical communication with and configured to capture modulated light reflected from the photodiode.

The present application further discloses various methods for optically correcting for phase-shifting. One method disclosed in the present application includes baising a photodiode to operate in Geiger mode, irradiating a photodiode with a first wavelength of light to which the photodiode is sensitive, the first wavelength of light transmitting a wavefront, irradiating the photodiode with a second wavelength of light to which the photodiode is insensitive, correcting for a phase-shift of the wavefront with the photodiode by modulating light reflected from a surface of the photodiode with a photorefractive reaction within the photodiode, and capturing the modulated reflected light containing a corrected wavefront.

In another embodiment, the present application discloses a method for correcting for phase-shifting and includes configuring a photodiode to operate in Geiger mode, irradiating a photodiode with a first wavelength of light transmitting a wavefront, initiating a photorefractive reaction within the photodiode with the first wavelength of light, irradiating the photodiode with a second wavelength of light to which the photodiode is insensitive, modulating light reflected from a surface of the photodiode with the photorefractive reaction within the photodiode to correct for phase-shifting in the wavefront, and capturing the modulated reflected light.

Other features and advantages of the embodiments of the high speed optical system disclosed herein will become apparent from a consideration of the following detailed description.

BRIEF DESCRIPTION OF THE DRAWINGS

A high speed optical system for correcting phase-shifting will be explained in more detail by way of the accompanying drawings, wherein:

FIG. 4 shows a schematic diagram of the embodiment of the optical system shown in FIG. 2 wherein the first light source is transmitting a wavefront at the first wavelength to the photodiode; and FIG. 5 shows a schematic diagram of the embodiment of the optical system shown in FIG. 2 wherein light at the second wavelength having a corrected wavefront thereon is reflected from the photodiode to a capture device.

DETAILED DESCRIPTION

The following discussion is directed to an optical system for phase-shifting a wavefront. More specifically, the optical system disclosed herein may be used to reduce or eliminate aberrations in a beam wavefront. In one embodiment, the optical system maybe used with coherent light systems, such as communication systems, imaging systems, sensing systems, etc. In an alternate embodiment, the optical system may used with incoherent light systems such as telescopes, imaging systems, etc.

Figure 1:
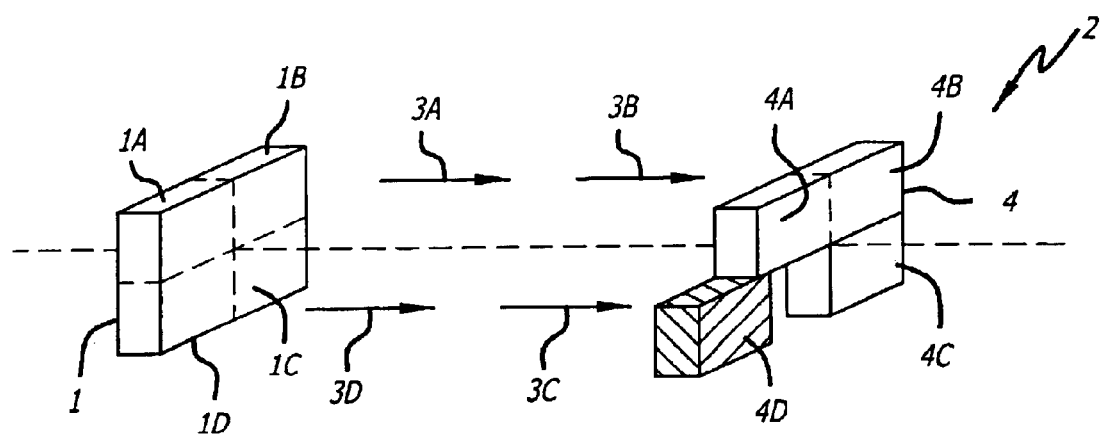
FIG. 1 shows an illustration of a wavefront propagating through a medium having a varying index of refraction.
Figure 2:
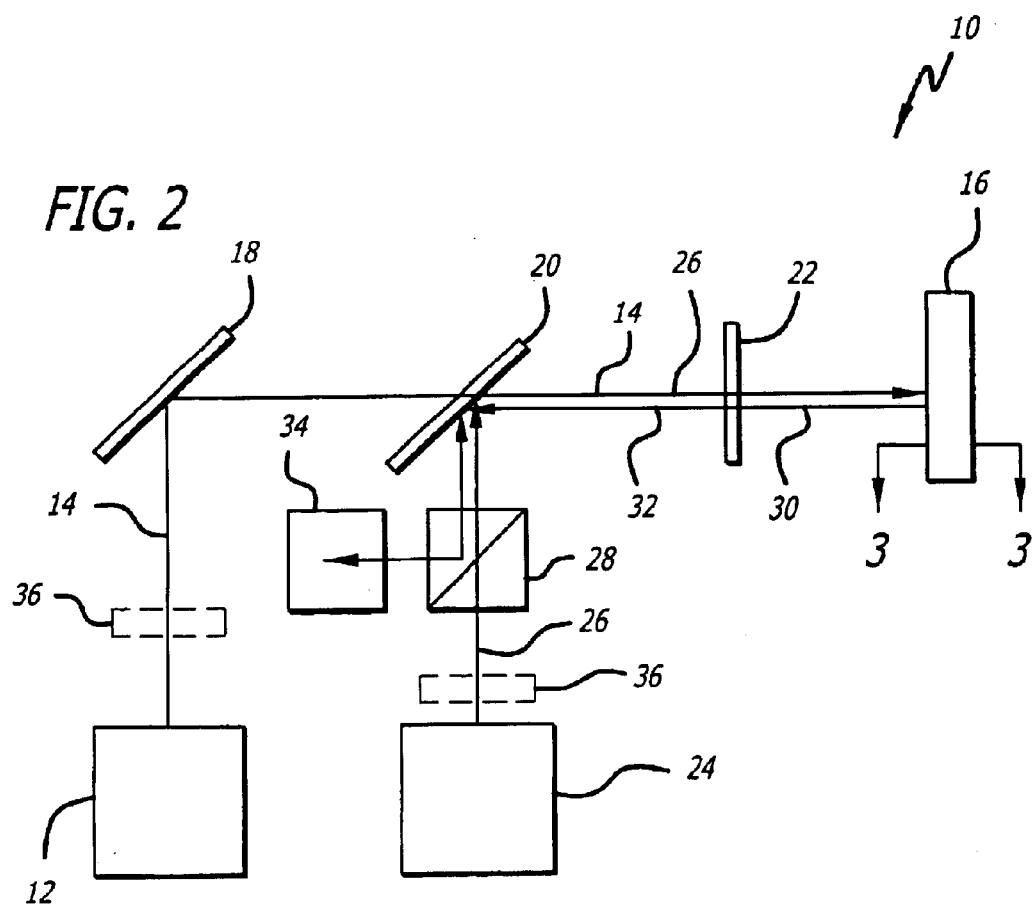
FIG. 2 shows a schematic diagram of an embodiment of an optical system having a first light source emitting a first wavelength and a second light source emitting a second wavelength to a photodiode.

FIG. 2 shows a schematic diagram of a high speed optical system for phase-shifting the wavefront of an incident beam. As shown in FIG. 2, the optical system 10 includes an image source or first light source 12 configured to emit light at a first wavelength 14. In one embodiment, the image source 12 is configured to emit a first wavelength of light 14 having a wavelength shorter than the bandgap of an avalanche photodiode (APD) 16. For example, in one embodiment, the first wavelength of light 14 is less than 1.59 microns. As a result, the first wavelength of light 14 will be absorbed by the APD 16, and may thus be considered an input to the APD 16. The first wavelength of light 14 is incident upon a beam director 18, which directs the light through a beam combiner 20 to the APD 16. As shown in FIG. 2, at least one optical filter 22 may be positioned within the optical path. In the illustrated embodiment, a λ/4 plate 22 is positioned within the optical path between the beam combiner 20 and the APD 16. Optionally, any number or variety of optical filters 22 may be used with the optical system 10.

Referring again to FIG. 2, the optical system 10 further includes a read source or second light source 24 configured to emit light 26 at a second wavelength to the APD 16. In one embodiment, the second wavelength of light 26 has a wavelength longer than the bandgap of the APD 16. As such, the second wavelength of light 26 will not be absorbed by the APD 16. The second wavelength of light 26 is incident upon and traverses through a beam splitter 28. Optionally, the beam splitter 28 may comprise a polarizing beam splitter. Thereafter, the second wavelength of light 26 is incident upon the beam combiner 20 and is combined with the first wavelength of light 14 emitted by the image source 12. The second wavelength of light 26, which is combined with the first wavelength of light 14, is directed through the λ/4 plate 22 and is incident upon the APD 16.

As shown in FIG. 2, reflected light 30 is reflected off a surface of the APD 16 and is incident upon the λ/4 plate 22 positioned within the optical path, which modulates the reflected light 30. As such, the reflected light 30 may be considered an output of the APD 16. The modulated reflected light 32 is incident upon the beam combiner 20 which directs the modulated reflected light 32 into a capture device 34 in optical communication with the beam splitter 28. Exemplary capture devices 34 include, without limitation, cameras, CCD devices, imaging arrays, photometers, and like devices. The reflected light 30 and modulated light 32 comprise the second wavelength of light 26 which is greater than the bandgap of the APD 16. As such, the reflected light 30 and modulated light 32 will not be absorbed by the APD 16. Optionally, additional optical components 36 may be positioned anywhere within the optical system 10. For example, additional optical component 36 may be positioned proximate to the image source 12. In an alternate embodiment, additional optical components 36 are positioned approximate to the read source 24. Exemplary additional optical components 36 include, without limitation, wavelength filters, spatial filters, shutters, light modulators, light valves, lens, objectives, and/or the like.

Referring again to FIG. 2, the high speed optical system of the present application utilizes an ADP 16 to phase-shift the incident wavefront. Optionally, any number of APDs 16 may be used within the optical system 10. For example, the APD 16 may comprise an array of multiple photodiodes. The APD 16 may be manufactured from any variety of material, including, without limitation, Indium Gallium Arsenide (InGaAs), Indium Gallium Arsenide Phosphide (InGaAsP), Silicon (Si), Germanium (Ge), Gallium Nitride (GaN), Silicon Carbide (SiC), or any other suitable materials. In addition, the APD 16 may be manufactured in any number of sizes or shapes as desired. For example, in one embodiment, the APD 16 may be configured to form an asymmetric Fabry-Perot etalon.

Figure 3:
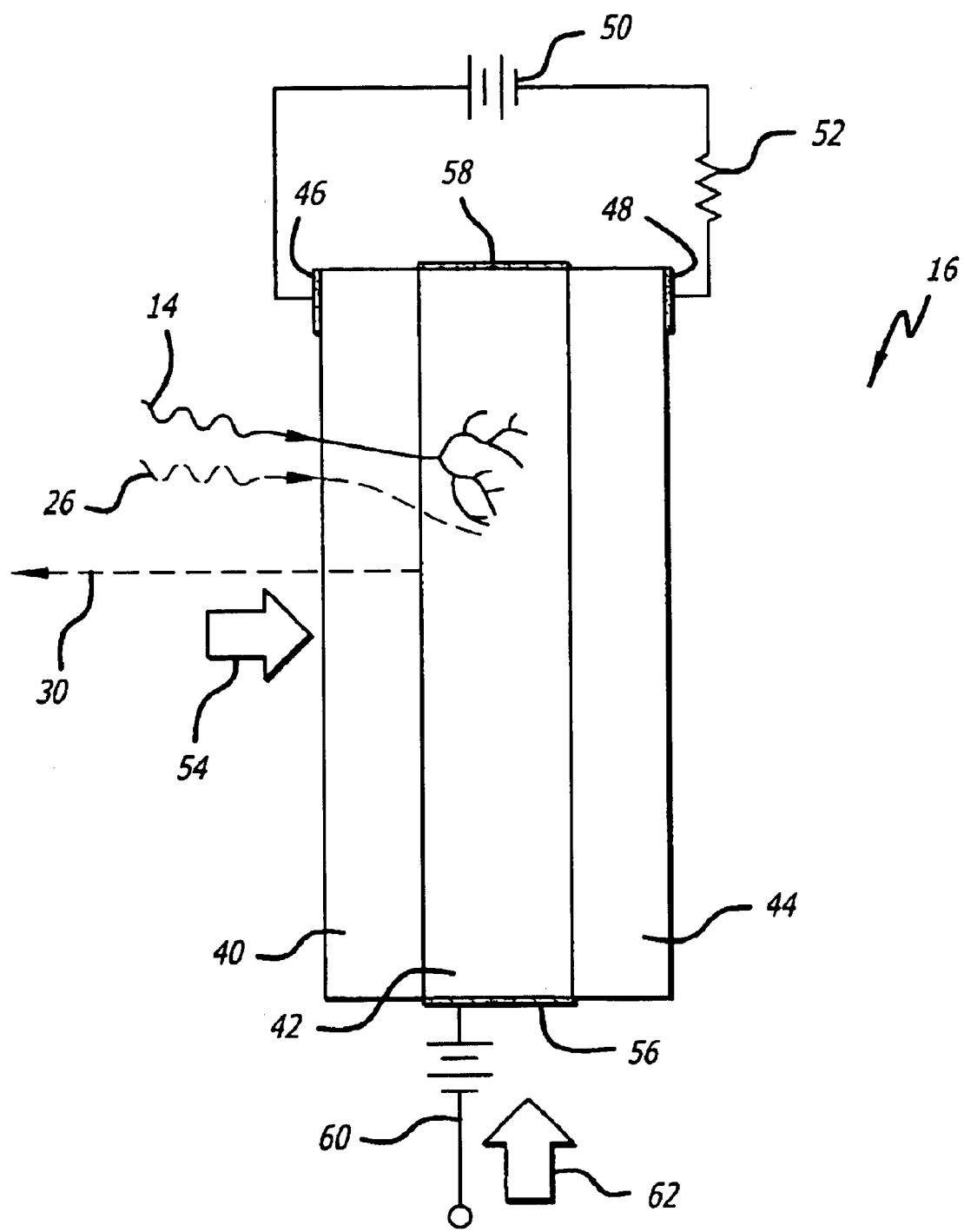
FIG. 3 shows a cross sectional view of an embodiment of a avalanche photodiode as viewed along lines 3—3 of FIG. 2 having a first wavelength and a second wavelength incident thereon.

In one embodiment, the APD 16 is configured to operate in Geiger mode. When operating in Geiger mode, a voltage greater than a breakdown voltage is applied to the APD 16. FIG. 3 shows an exemplary APD 16 configured to operate in Geiger mode. As shown, the APD 16 includes a first layer 40, a second layer 42, and a third layer 44. In one embodiment, the first layer 40 comprises a positively doped semiconductive material configured to permit an avalanche of electrons to be freed when struck with a photon. For example, in one embodiment the positively doped semiconductive material comprises silicon. In an alternate embodiment, the first layer 40 is comprised of indium phosphide and is heavily doped with a P-type material such as zinc. As a result, the first layer 40 loses its semiconductive properties and functions similar to a conductor. The second layer 42 is either a negative layer or an insulator. For example, the second layer 42 maybe manufactured without doping or with low doping. The third layer 44 is a negative layer. In one embodiment, the third layer 44 is moderately doped with an N-type material. In another embodiment, the third layer 44 is heavily doped with an N-type material such as sulfur, for example, such that the third layer no longer behaves as a semiconductor but instead has a reasonable good conductivity. Optionally, the first, second, and/or third layers 40, 42, 44, respectively, may include at least one surface which may be partially reflective to light of a selective wavelength.

To operate the APD 16 in Geiger mode at least one electric field is applied across the APD 16. As shown in FIG. 3, in one embodiment, a first set of electrodes 46, 48 is connected to a voltage source 50 and configured to apply a charge across the APD 16. Optionally, a circuit resistor 52 may be positioned between the voltage source 50 and at least one of the electrodes 46, 48. As a result, a first electric field 54 may be created across the APD 16 and configured to permit the APD 16 to be operated in Geiger mode. Optionally, the APD 16 may also include a second set of electrodes 56, 58 coupled to a second voltage source 60. As such, a second electric field 62 may be created within or surrounding the APD 16. In the illustrated embodiment, the second electric field 62 is perpendicular to the first electric field 54. Optionally, any number of electric fields or field directions may be used. Furthermore, the APD 16 may be manufactured in any number of sizes or shapes as desired. When operated in Geiger mode, the incidence of a photon on the APD 16 causes a chain reaction of freeing electrons in a photodiode material which continues until the current within an electrical field applied to the APD 16 drops to zero or until the voltage falls below the breakdown voltage.

FIGS. 4–5 show an embodiment of the optical system 10 during use. As shown in FIG. 4, the first wavelength of light 14 emitted by the image source 12 is directed by the beam director 18 to the APD 16. During propagation, the wavefront 70 may encounter a media having a varying index of refraction. As such, an optical path difference may exist between various portions of the wavefront 70, thereby resulting in a phase-shift. As a result, the wavefront 70 may become defocused. Referring again to FIG. 4, the APD 16 is simultaneously irradiated with the second wavelength of light 26 emitted by the read source 24. The first wavelength of light 14 containing the wavefront 70 and a second wavelength of light 26 are combined by the beam combinder 20 and are directed through the λ/4 plate 22 to the APD 16. The incidence of the first wavelength of light 14 on the APD 16 causes localized pixel heating due to absorption within the photodiode material, thereby inducing a modulation of the refractive index of the photodiode material. Further, the localized pixel heating due to absorption within the photodiode material quickly normalizes thereby compensating for the defocusing of the wavefront 70 caused by the optical path difference. For example, normalization of the pixel heating may occur within about 1 nanosecond.

As described above, the APD 16 may be configured to approximate an asymmetric Fabry-Perot etalon. Like the modulation of refractive index described above, the reflectivity of the APD 16 is modulated at a point where the photon of the first wavelength of light 14 is incident upon the APD 16. The index of refraction and reflectivity of the photodiode material is modulated in the same pattern as the wavefront 70 from the first wavelength of light 14. However, the phase-shift contained within the wavefront 70 has been reduced or eliminated within the modulated image pattern formed within the photodiode material. As such, the light 30 reflected from the APD 16 at the second wavelength, which is greater than the bandgap of the APD, 16 is modulated to reproduced the corrected wavefront 70' while reducing or eliminating the phase-shift phenomena present in the incident wavefront 70.

As shown in FIG. 5, the reflected light 30 carrying the corrected wavefront 70' is incident upon the λ/4 plate 22 which permits light of a selected polarization to traverse therethrough and which is captured by the capture device 34 coupled to the beam splitter 28. The capture device 34 captures the corrected wavefront 70' at the second wavelength 26. As such, the reflected light 32 at the second wavelength received at the capture device 34 is modulated to include the corrected wavefront 70' and has the same intensity pattern as the first wavelength 14. However, unlike prior art systems, the high speed optical system 10 disclosed herein optically corrects for aberrations caused by phase-shifting without mechanical actuators to compensate for optical path differences. Further, the high speed optical system 10 is capable of correcting phase-shift aberrations in time ranges on the order of 1 nanosecond.

Embodiments disclosed herein are illustrative of the principles of the invention. Other modifications may be employed which are within the scope of the invention, thus, by way of example but not of limitation, alternative photodiode configurations, alternative beam director devices, alternative optical filters, and alternative electronic components. Accordingly, the devices disclosed in the present application are not limited to that precisely as shown and described herein.

What is claimed is:

1. A device, comprising:
   a photodiode which is sensitive to a wavelength of light;
   an image source irradiating a wavefront of a first wavelength on the photodiode to which the photodiode is sensitive, the wavefront containing an optical path difference induced phase-shift;
   a read source irradiating photons of a second wavelength on the photodiode to which the photodiode is insensitive;
   an electric field across the photodiode in excess of the breakdown voltage thereof and configured to result in an avalanching of electrons in the photodiode when the photons from the first source strike the photodiode, the avalanching electrons resulting in a photorefractive response which changes the index of refraction in the photodiode; and a capture device in optical communication with and configured to capture light reflected from the photodiode.

2. The device of claim 1 wherein the first source of photons transmits an optical signal to the photodiode.

3. The device of claim 1 wherein the first wavelength is less than the bandgap of the photodiode.

4. The device of claim 1 wherein the second wavelength is greater than the bandgap of the photodiode.

5. The device of claim 1 wherein the light reflected from the photodiode is modulated by the photoreactive response of the photodiode.

6. The device of claim 1 further comprising a beam combiner configured to combine the first and second wavelengths, the beam combiner positioned between the photon sources and the photodiode.

7. The device of claim 1 further comprising at least one optical filter positioned between the photon sources and the photodiode.

8. The device of claim 7 wherein the optical filter comprises a λ/4 plate.

9. The device of claim 1 wherein the capture device comprises at least one device selected from the group consisting of cameras, CCD devices, imaging arrays, and photometers.

10. The device of claim 1 further comprising at least one optical component positioned between at least one of the photon sources and the photodiode.

11. The device of claim 10 wherein the at least one optical component is selected from the group consisting of wavelength filters, spatial filters, shutters, light modulators, light valves, lens, lens systems, and objectives.

12. The system of claim 1 wherein the photodiode further comprises an InGaAsP photodiode.

13. The device of claim 1 wherein the photodiode is configured to operate in Geiger mode.

14. A device, comprising:

an InGaAsP photodiode which is sensitive to a wavelength of light;

a first source of photons configured to transmit a wavefront at a first wavelength to which the photodiode is sensitive incident on the photodiode, the wavefront having an optical path difference induced phase-shift;

a second source of photons at a second wavelength to which the photodiode is insensitive incident on the photodiode;

an electric field across the photodiode in excess of the breakdown voltage thereof and configured to result in an avalanching of electrons in the photodiode when the photons from the first source strike the photodiode, the avalanching electrons resulting in a photorefractive response which changes the index of refraction in the photodiode; and a capture device in optical communication with and configured to capture light reflected from the photodiode.

15. The device of claim 14 wherein the first wavelength is less than the bandgap of the photodiode.

16. The device of claim 14 wherein the second wavelength is greater than the bandgap of the photodiode.

17. The device of claim 14 wherein the light reflected from the photodiode is modulated by the photoreactive response of the photodiode.

18. The device of claim 14 further comprising a beam combiner positioned between the light sources and the photodiode.

19. The device of claim 14 further comprising a polarizing plate positioned between the light sources and the photodiode.

20. The device of claim 14 wherein the capture device comprises a camera.

21. The device of claim 14 wherein the photodiode is configured to operate in Geiger mode.

22. A system, comprising:

an InGaAsP photodiode having a bandgap, the photodiode configured to operate in Geiger mode;

a first photon source configured to transmit a wavefront at a first wavelength to which the photodiode is sensitive incident on the photodiode, the wavefront having an optical path difference induced phase-shift, the first wavelength less than the bandgap of the photodiode;

a second photon source configured to emit light of a second wavelength, the second wavelength greater than the bandgap of the photodiode;

a beam combiner positioned within an optical path and configured to combine the first and second wavelength;

an electric field applied across the photodiode greater than a breakdown voltage thereof, the electric field configured to result in avalanching of electrons in the photodiode when photons from a first photodiode are incident thereon, the avalanche of electrons resulting in a photorefractive response within the photodiode; and a capture device in optical communication with and configured to capture modulated light reflected from the photodiode.

23. A method, comprising:

baising a photodiode to operate in Geiger mode;

irradiating a photodiode with a first wavelength of light to which the photodiode is sensitive, the first wavelength of light transmitting a wavefront;

irradiating the photodiode with a second wavelength of light to which the photodiode is insensitive;

correcting for a phase-shift of the wavefront with the photodiode by modulating light reflected from a surface of the photodiode with a photorefractive reaction within the photodiode; and capturing the modulated reflected light containing a corrected wavefront.

24. The method of claim 23 further comprising filtering the modulated reflected light prior to capture.

25. A method comprising configuring a photodiode to operate in Geiger mode;

irradiating a photodiode with a first wavelength of light transmitting a wavefront;

initiating a photorefractive reaction within the photodiode with a first wavelength of light;

irradiating the photodiode with a second wavelength of light to which the photodiode is insensitive;

modulating light reflected from a surface of the photodiode with the photorefractive reaction within the photodiode to correct for phase-shifting in the wavefront; and capturing the modulated reflected light.

* * * * *